(12) United States Patent
Nguyen

(10) Patent No.: US 6,882,833 B2
(45) Date of Patent: Apr. 19, 2005

(54) TRANSFERRING DATA IN A WIRELESS COMMUNICATION SYSTEM

(75) Inventor: Hung Nguyen, Milpitas, CA (US)

(73) Assignee: Blue7 Communications, Milpitas, CA (US)

( * ) Notice: Subject to any disclaimer, the term of this patent is extended or adjusted under 35 U.S.C. 154(b) by 474 days.

(21) Appl. No.: 10/079,751

(22) Filed: Feb. 22, 2002

(65) Prior Publication Data

US 2003/0181221 A1 Sep. 25, 2003

(51) Int. Cl.$^7$ .................................................. H04B 1/38
(52) U.S. Cl. ...................... 455/137; 455/303; 455/562.1; 375/146; 375/148
(58) Field of Search .............................. 455/137, 303, 455/132, 276.1, 272, 426.2, 555, 562.1, 560, 561; 375/144, 148, 147, 149, 150, 232, 343, 346, 347

(56) References Cited

U.S. PATENT DOCUMENTS

| 6,374,124 | B1 | * | 4/2002 | Slabinski | 455/562.1 |
| 6,404,803 | B1 | * | 6/2002 | Wang et al. | 375/148 |
| 6,434,375 | B1 | * | 8/2002 | Chulajata et al. | 455/276.1 |
| 6,483,459 | B1 | * | 11/2002 | Hou et al. | 342/378 |
| 6,587,451 | B1 | * | 7/2003 | Kwon et al. | 370/339 |
| 6,650,881 | B1 | * | 11/2003 | Dogan | 455/276.1 |
| 6,771,933 | B1 | * | 8/2004 | Eng et al. | 455/41.2 |
| 6,785,558 | B1 | * | 8/2004 | Stratford et al. | 455/561 |

* cited by examiner

Primary Examiner—Edward F. Urban
Assistant Examiner—Blane J. Jackson
(74) Attorney, Agent, or Firm—Squire, Sanders & Dempsey, L.L.P.

(57) ABSTRACT

The present invention, illustrated in various embodiments, provides mechanisms for transferring data in wireless communications systems. In one exemplary embodiment, the data is transferred in an access point (AP) used in a wireless local area network (WLAN), which comprises a wireless communication system connected to a local area network (LAN). The access point includes a baseband chip capable of adapting various radio frequency (RF) units. Each RF unit in turns includes a plurality of RF sub units connected in a daisy-chain manner. Each RF sub unit is also connected to at least one antenna. The access point thus includes a number of antennas that, together with the RF units and the baseband chip, form a smart antenna. In a receiving mode, the data received from the smart antenna travels through the RF sub units in each RF unit, and the data from the RF units travels to the baseband chip. Conversely, in a transmitting mode, the data transmitted from the baseband chip travels to the RF units, and in each RF unit the data travels through the sub units to the smart antenna. In one embodiment, each RF sub unit is removably connected to another RF sub unit, and each RF unit is removably connected to the baseband chip, which allows flexibility in selecting a system configuration with an appropriate number of antennas for the smart antenna.

41 Claims, 11 Drawing Sheets

TRANSFERRING DATA IN A WIRELESS COMMUNICATION SYSTEM

FIELD OF THE INVENTION

The present invention relates generally to wireless communication systems, and more specifically to transferring data in such systems.

BACKGROUND OF THE INVENTION

Antennas are commonly used in wireless communication systems in which the antennas radiate power for signals to be received and transmitted through the antennas to appropriate signal transmitters and receivers. Adaptive antenna refers to an array of antennas capable of dynamically changing its antenna pattern to adjust to noise, interference, and different paths of users using the antenna, etc. Adaptive antennas form beams for transmission and enhance signals because they can adjust their patterns to track mobile users. Switched beam technologies use a number of beams at an antenna site for the receiver to select the beam that provides the best signals. Smart-antenna systems usually include both adaptive antennas and switched beam technologies. The number of antennas in an array for use in adaptive antennas and/or smart antennas varies depending on the applications using the antennas, the distance between the wireless transmitters and receivers, whether the system processing the wireless signals are powerful or not, etc. However, in general, the more antennas are used in a system, the better it is for the system's reception and transmission performance. Unfortunately, as the number of antennas increases, transferring the data through the antennas becomes more difficult and expensive because adding antennas to a system results in additional components and costs to the system. For example, in various cases, additional radio-frequency (RF) data paths must be added, and, as the number of these paths increases, the interface between the paths and the baseband chip becomes more complicated. Additionally, various current approaches do not provide the flexibility in choosing and/or adjusting the number of antennas as desired. Once a number of antennas are designed for a system, the system is fixed with that number of antennas. Consequently, there is a need to provide mechanisms to solve the above problems and associated issues.

SUMMARY OF THE INVENTION

The present invention, illustrated in various embodiments, provides mechanisms for transferring data in wireless communications systems. In one exemplary embodiment, the data is transferred in an access point (AP) used in a wireless local area network (WLAN), which comprises a wireless communication system connected to a local area network (LAN). The access point includes a baseband chip capable of adapting various radio frequency (RF) units. Each RF unit in turns includes a plurality of RF sub units connected as a daisy chain. Each RF sub unit is also connected to at least one antenna. The access point thus includes a number of antennas that, together with the RF units and the baseband chip, form a smart antenna.

In a receiving mode, the data received from the smart antenna travels through the RF sub units in each RF unit, and the data from the RF units travels to the baseband chip. Conversely, in a transmitting mode, the data transmitted from the baseband chip travels to the RF units, and in each RF unit the data travels through the sub units to the smart antenna.

In one embodiment, each RF sub unit is removably connected to another RF sub unit, and each RF unit is removably connected to the baseband chip, which allows flexibility in selecting a system configuration with an appropriate number of antennas for the smart antenna.

BRIEF DESCRIPTIONS OF THE DRAWINGS

DETAILED DESCRIPTION OF THE INVENTION

System Overview

Figure 1:
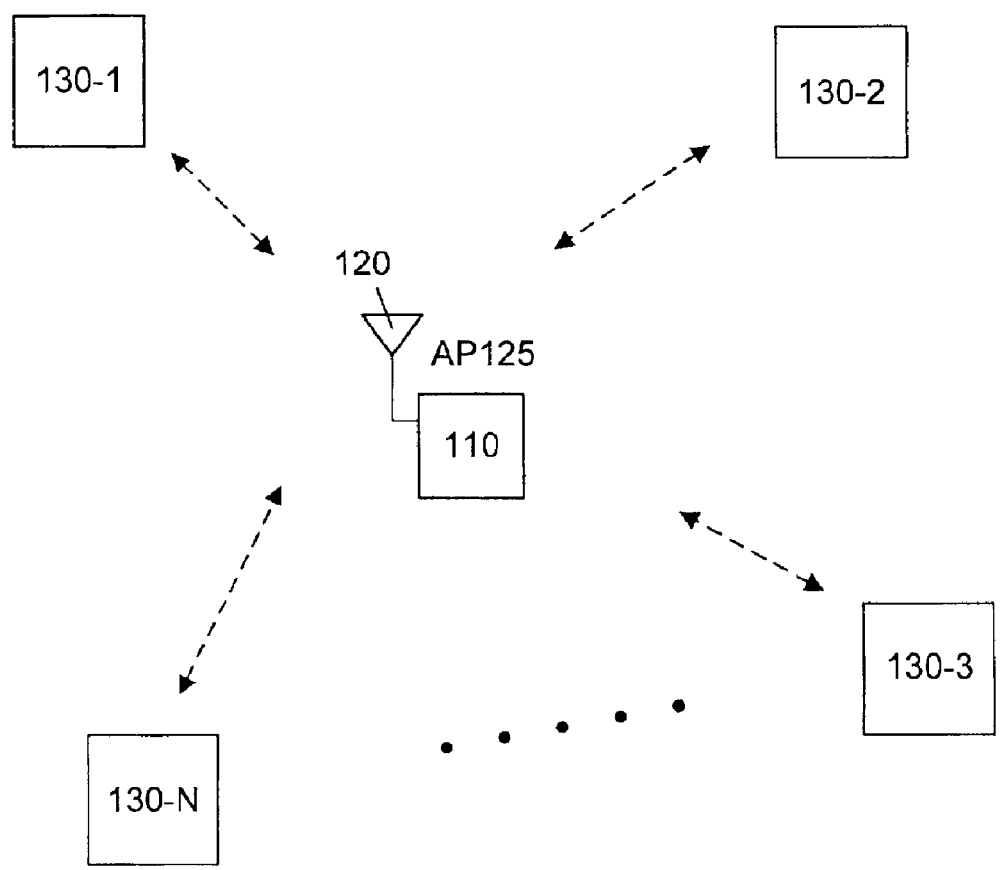
FIG. 1 shows a wireless communication system upon which embodiments of the invention may be implemented.

FIG. 1 shows a wireless communication system 100 upon which embodiments of the invention may be implemented. Exemplary technologies used in system 100 include the code-division multiple access (CDMA), the time-division multiple access (TDMA), the global system for mobile communications (GSM), etc. System 100 includes an access point 125 and a plurality of stations 130-1, 130-2, . . . , 130-N. Access point 125 includes an access station 110 connected to a smart antenna 120. In one embodiment, access point 125 is connected to an electronic network (not shown), which transmits information through access station 110, smart antenna 120, and wirelessly to stations 130. Similarly, the network wirelessly receives information from stations 130 through smart antenna 120 and access station 110, etc. Generally, access station 110 processes signals received or sent through antenna 120. To improve reception and transmission performance of a particular station 130, access point 125 allows signal beams radiating through antenna 120 to be focused to that station 130.

In one embodiment, a local area network (LAN) is used as the network in the above discussion. However, the invention is not limited to LANs, other networks are within the scope of the invention, including, for example, the digital subscriber line (DSL), the Ethernet, the cable modem, etc. LAN is a computer network that spans a relatively small area. Most LANs are confined to a single building or group of buildings Normally, a station 130 is a mobile device wirelessly communicating with the network through access point 125. Examples of a station 130 include a laptop or a desktop computer, a personal digital assistance (PDA), a cellular phone, etc. Each station 130 includes at least one antenna and a processing unit processing signals to communicate wirelessly with access point 125. The processing unit may be different from access station 110, but, in general, perform the same function as access station 110. Even though stations 130 are moveable from one position to another position, to communicate effectively with access point 125, a station 130 must be within the coverage range of access point 125. This coverage range varies depending on various factors including the transmitting frequency, the number of antennas in smart antenna 120 or in stations 130, the power of each antenna, the processing power of access station 110 and of the processing unit in stations 130, etc. In general, a lower-frequency system has a wider range of coverage than a higher-frequency system. For example, a system with the IEEE 802.11b or 802.11g protocol has a coverage area four times greater than that of the 802.11a protocol because the 802.11b and 802.11g protocol operates at a 2.4 Ghz frequency, which is much slower than the 5.0 Ghz frequency of the 802.11a protocol. Those skilled in the art will recognize that IEEE stands for the "Institute of Electrical and Electronics Engineers."

The Access Point

Figure 2A:
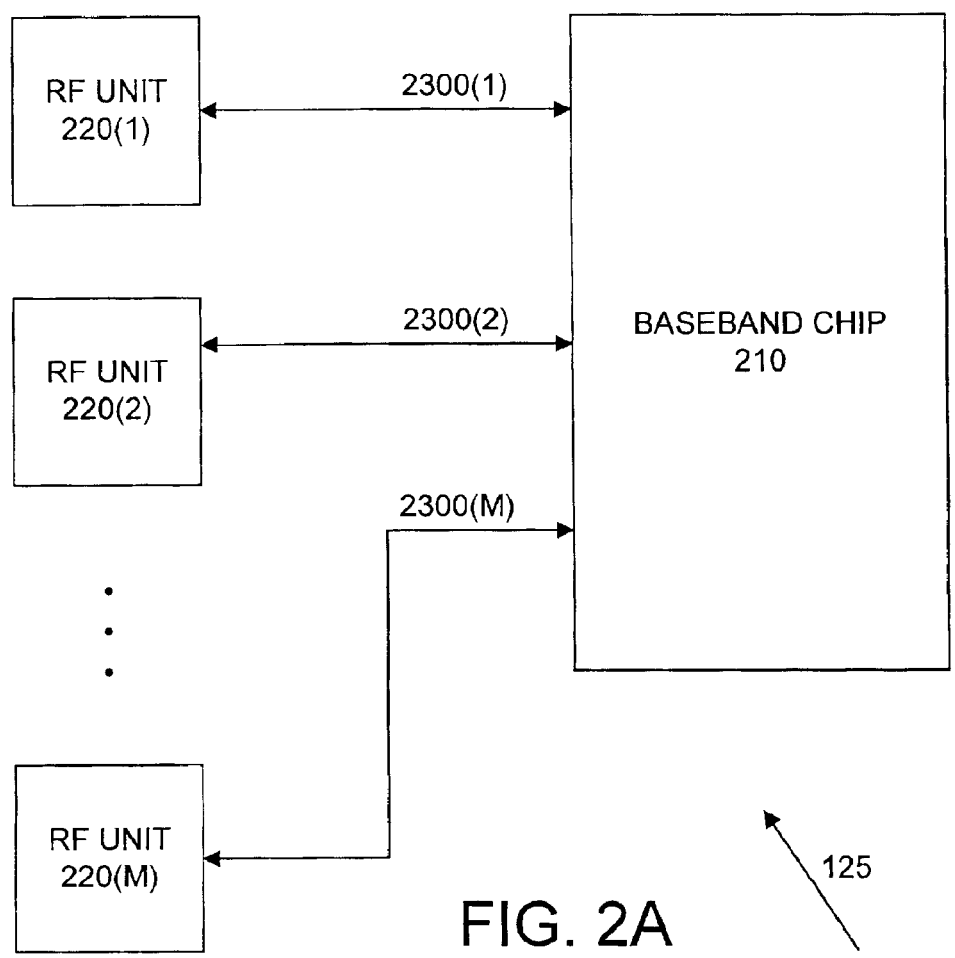
FIG. 2A shows an access point in accordance with one embodiment.

FIG. 2A shows access point 125 having a plurality of RF units 220(1) to 220(M) connected to a baseband unit or baseband chip 210 at lines 2300(1) to 2300(M), respectively, in accordance with one embodiment. A RF unit 220 includes a plurality of RF sub units 2200 (not shown), each of which carries at least one antenna. The antennas of all RF sub units 2200, together with RF sub units 2200 and baseband chip 210, function as smart antenna 120.

In the receiving mode, RF units 220 process the analog radio frequency signals received from smart antenna 120, down-convert the radio frequency to the intermediate frequency, combine and digitize the signals, etc. In the same receiving mode, baseband chip 210 demodulates the digitized signals received from RF units 220, converts them to the digital domain of zeros and ones, and sends them to the LAN, etc. In the transmitting mode, baseband chip 210 receives the digital data from the LAN, modulates the data, and sends it to RF units 220. RF units 220, upon receiving the digital data, convert it to analog, up-convert the data's intermediate frequency to the radio frequency, and send the data to smart antenna 120, which transmits the data over the air.

In one embodiment, each RF unit 220 is removably connected to baseband chip 210. That is, each unit 220 is easily removed from or attached to baseband chip 210, which can be done by any convenient mechanism. In embodiments where printed-circuit boards (PCBs) are used to implement units 220 and baseband chip 210, any mechanism for connecting PCBs is effective.

In embodiments that allow either receiving or transmitting the data at a time, such as in the LAN situation, each RF unit 220 uses only one connecting point at line 2300 for both receiving and transmitting. In embodiments that allow both receiving and transmitting at the same time, each RF unit 220 uses one connecting point for receiving and one connecting point for transmitting. Reducing connecting points between a RF unit 220 and baseband chip 210 simplifies the design of baseband chip 210 and reduces its packaging costs.

Figure 2B:
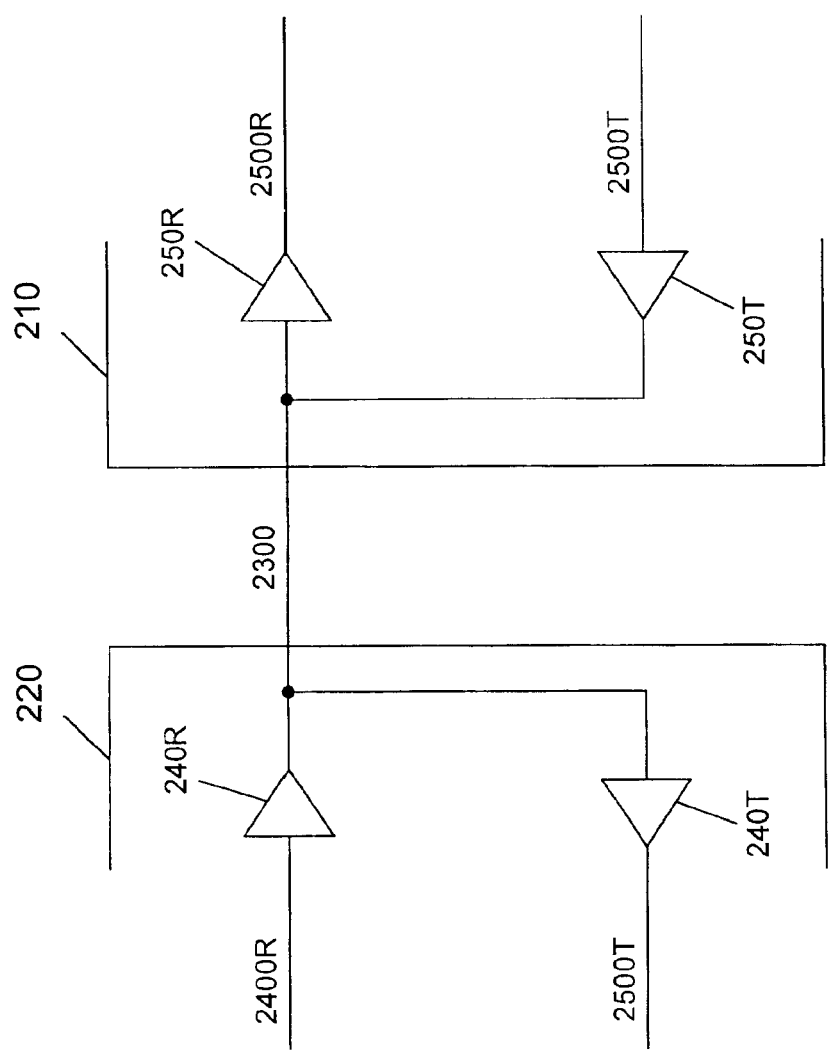
FIG. 2B illustrates a mechanism in which one connecting point between an RF unit and the baseband unit may be used for both a receiving mode and a transmitting mode.

FIG. 2B shows one embodiment in which one connecting point at a line 2300 is used for both receiving and transmitting. In this FIG. 2B, a RF unit 220 is connected at line 2300 with baseband chip 210. RF unit 220 includes a tristate buffer 240R and a tristate buffer 240T, and baseband chip 210 includes a tristate buffer 250R and a tristate buffer 250T. In the receiving mode, buffers 240R and 250R are enabled while buffers 240T and 250T are disabled so that the data on line 2400R travels through buffer 240R, line 2300, and buffer 250R, to line 2500R. Similarly, in the transmitting mode, buffers 240R and 250R are disabled while buffers 240T and 250T are enabled so that the data on line 2500T travels through buffer 250T, line 2300, and buffer 240T, to line 2500T.

The RF Unit

Figure 3:
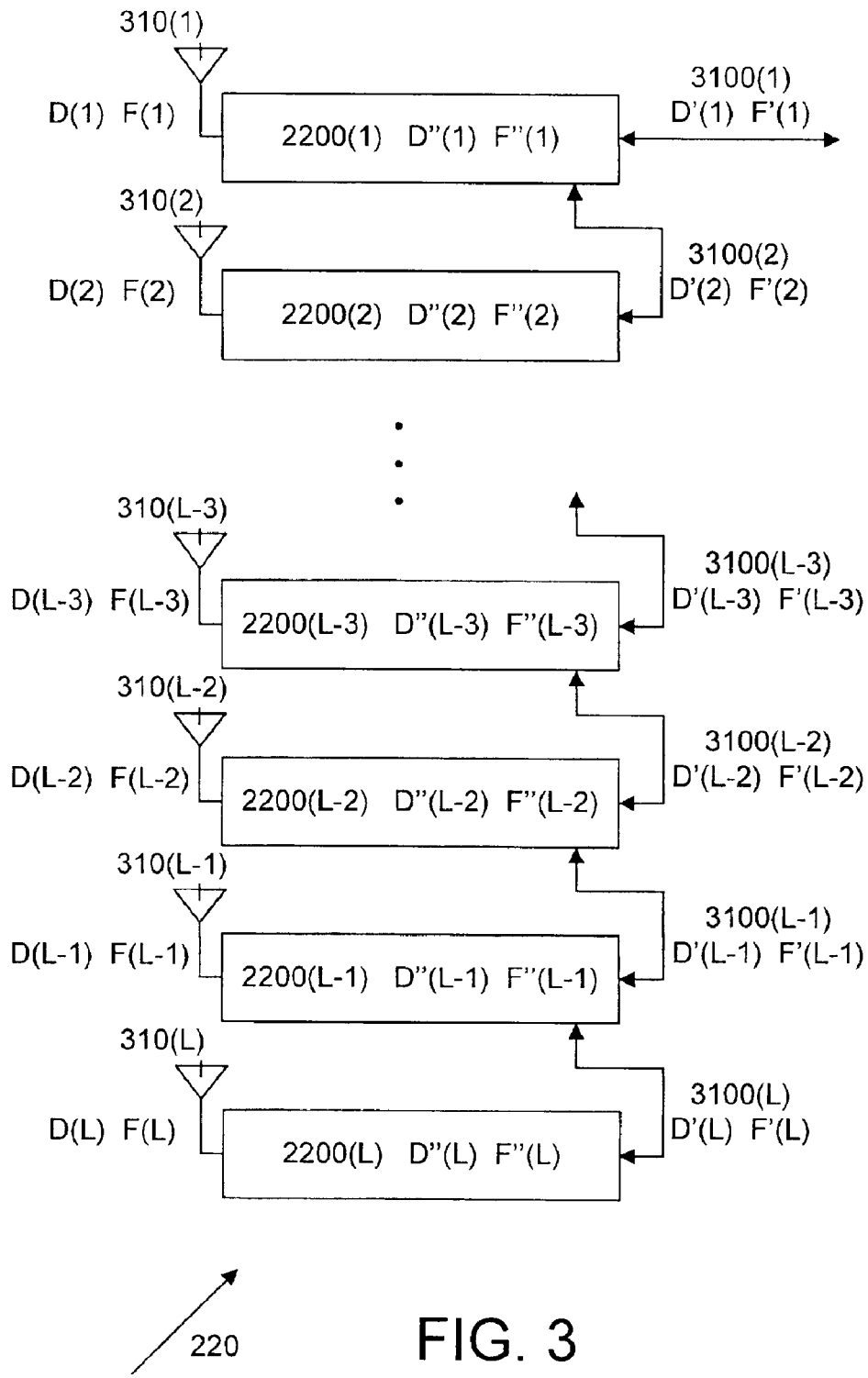
FIG. 3 shows a RF unit in accordance with one embodiment.

FIG. 3 shows a unit 220 including L number of sub units 2200, e.g., sub unit 2200(1) to sub unit 2200(L), in accordance with one embodiment. As discussed above, each sub unit 2200 is connected to at least one antenna, and the number of antennas per sub unit 2200 can be conveniently selected. In one embodiment, the distance between two antennas equals to ¼ of the wavelength of the carrier or wallet frequency of the antenna. A wavelength of a signal is one over the frequency of that signal. For illustrative purposes, FIG. 3 shows that each RF sub unit 2200(1) to 2200(L) is connected to an antenna 310(1) to 310(L), respectively. Each antenna 310 is associated with a carrier RF frequency F(1) to F(L). Each sub unit 2200, down-converts each RF frequency F(1) to F(L) into each intermediate frequency (IF), which, through a serializing process, is transformed into each frequency F"(1) to F"(L), respectively. For illustration purposes, the data received from each antenna 310 is referred to as data D(1) to data D(L), respectively. Each sub unit 2200 also transforms data D(1) to data D(L) into data D"(1) to data D"(L), respectively, each of which corresponds to each frequency F".

In FIG. 3, RF sub units 2200 are connected serially or as a daisy chain. That is, a first sub unit is connected to a second sub unit, the second sub unit is connected to a third sub unit, etc., and the last sub unit is connected to baseband chip 210. FIG. 3 shows that sub unit 2200(L) is connected to sub unit 2200(L−1) at line 3100(L); sub unit 2200(L−1) is connected to sub unit 2200(L−2) at line 3100(L−1); sub unit 2200(L−2) is connected to sub unit 2200(L−3) at line 3100(L−2), etc., until sub unit 2200(2) is connected to sub unit 2200(1) at line 3100(2). Further, sub unit 2200(1) (or RF unit 220 as a whole) is connected to baseband chip 210 at line 3100(1), which is a line 2300 in FIG. 2A. For illustration purposes, the data transmitted at line 3100(1) to line 3100(L) are referred to as data D'(1) to D'(L). Similarly, the frequency transmitted at line 3100(1) to line 3100(L) is referred to as frequency F'(1) to frequency F'(L), respectively.

In one embodiment of a receiving mode, data D'(L) on line 3100(L) corresponds to data D"(L). Data D'(L) is sent through sub unit 2200(L−1), which combines data D"(L−1) and data D'(L) to form data D'(L−1) on line 3100(L−1). Data D'(L−1) is sent through sub unit 2200(L−2), which combines data D"(L−2) and data D'(L−1) to form data D'(L−2), etc. Finally, data D'(2) is sent through sub unit 2200(1), which combines data D"(1) and data D'(2) to form data D'(1) online 3100(1). In fact, data D'(1) is the combined data of data D"(1) to data D"(L). Further, if I is an integer, then data D'(I) is the combined data of data D"(I) and data D"(I+1). For example, if L equals to 4 and I equals to 2 then data D'(2) is the combined data of data D"(2) and data D'(3), wherein data D'(3) is the combined data of data D"(3) and data D"(4).

In one embodiment of a transmitting mode, data D'(1) on line 3100(1) corresponds to the combined data D"(1) to D"(L). Data D'(1) is sent to sub unit 2200(1), which keeps the data D"(1) for itself and sends the rest of the data to sub unit 2200(2) on line 3100(2). Sub unit 2200(2) keeps the data D"(2) for itself and sends the rest of the data to sub unit 2200(3) on line 3100(3), etc. Finally, data D'(L), which corresponds to data D"(L), is sent through line 3100(L) to sub unit 2200(L). In the above discussion, each sub unit 2200(1) to 2200(L), through a up-converting process, transforms data D"(1) to D"(L) into data D(1) to D(L), which is sent through antenna 310(1) to antenna 310(L), respectively.

Each RF frequency F can be any frequency within the electromagnetic spectrum associated with radio wave propagation, and can be different for one antenna 310 to another antenna 310. However, in various embodiments, all frequencies F are substantially the same, and are compatible with the IEEE 802.11 standard, which runs at 2.4 GZ to 5.0 GHZ. Further, frequency F'(1) to F'(L) corresponds to the frequency of data D'(1) to data D'(L), respectively. Additionally, frequency F'(L) corresponds to frequency F"(L); frequency F'(L−1) is the sum of frequency F"(L−1) and frequency F'(L); frequency F'(L−2) is the sum of frequency F"(L−2) and frequency F'(L−1); and frequency F'(1) is the sum of frequency F"(1) and frequency F'(2) or the sum of all frequency F"(1) to frequency F"(L). If I is an integer, then frequency F'(I) is the sum of frequency F"(I) and frequency F'(I+1). For illustrated purposes, let L equals to 4 and each frequency F"(1) to F"(4) equals to 10 MHZ, then frequency F'(1) equals to 40 MHZ (10 MHZ*4).

In one embodiment, the maximum frequency allowable for frequency F'(1), or the maximum frequency allowable at line 3100(1), determines the maximum number of RF sub units 2200 allowable in a daisy chain in a unit 220. This maximum frequency allowable for frequency F'(1) varies depending on various factors, including, for example, the material forming the printed-circuit board (PCB) implementing RF units 220 and baseband chip 210, the noise tolerance of the PCB, the distance between RF units 220 and baseband chip 210, etc. In general, the longer the distance, the lower the frequency is allowable because of the noise coupling and signal distortion, etc. If each frequency F" of each RF sub unit 2200 equals to each other, then the maximum number of sub units 2200 allowable in a daisy chain in a unit 220 is obtained by dividing the maximum frequency allowable for frequency F'(1) by the frequency F". Consequently, if each frequency F" equals to 10 MHZ, and the maximum frequency allowable for frequency F'(1) is 100 MHZ, then the maximum number of sub units 2200 allowable in the daisy chain is 10 (100 MHZ/10 MHZ). Similarly, if the maximum frequency allowable for F'(1) is 150 MHZ, then the maximum number of sub units 2200 allowable in the daisy chain is 15 (150 MHZ/10 MHZ), etc.

In one embodiment, each sub unit 2200 is removably connected to another sub unit in unit 220. Consequently, depending on the number of antennas desired for a particular application, a combination of a number of antennas per sub unit 2200, a number of sub units 2200 per unit 220, and a number of units 220 per baseband chip 210 may be selected. For example, if six antennas are desired, then two antennas per each sub units 2200, and three sub units 2200 per each unit 220 may be selected. Alternatively, one antenna per each sub unit 2200, three sub units 2200 per unit 220, and two units 220 may be selected, etc. The invention is not limited to a number of antennas per sub unit 2200, a number of sub units 2200 per unit 220, or a number of units 220 connected to baseband chip 210. As additional antennas are added to a sub unit 2200, additional sub units 2200 are added to units 220, and/or additional units 220 are added to baseband chip 210, additional antennas are added to baseband chip 210. Alternatively speaking, additional antennas are added to smart antenna 120 and access point 125.

Because RF sub units 2200 are connected serially to each other and to baseband chip 210, connecting L number of RF sub units 2200 in an RF unit 220 to baseband chip 210 requires one connecting point or interface. This connecting point is also the connecting point of a RF unit 220 to baseband chip 210 at a line 2300 in FIG. 2A or a line 3100(1) in FIG. 3. If the L number of RF sub units 2200 were to be connected in parallel to baseband chip 210, then L number of connecting points would be required because each number of RF sub unit 2200 requires one connecting point. Reducing the number of connecting points for baseband chip 210 reduces its packaging costs. Each RF sub unit 2200 may be removably connected to each other by any convenient mechanism. In embodiments where printed circuit boards (PCBs) are used to implement sub units 2200, any mechanism for connecting PCBs is effective.

The Data in the Receiving Mode

Figure 4:
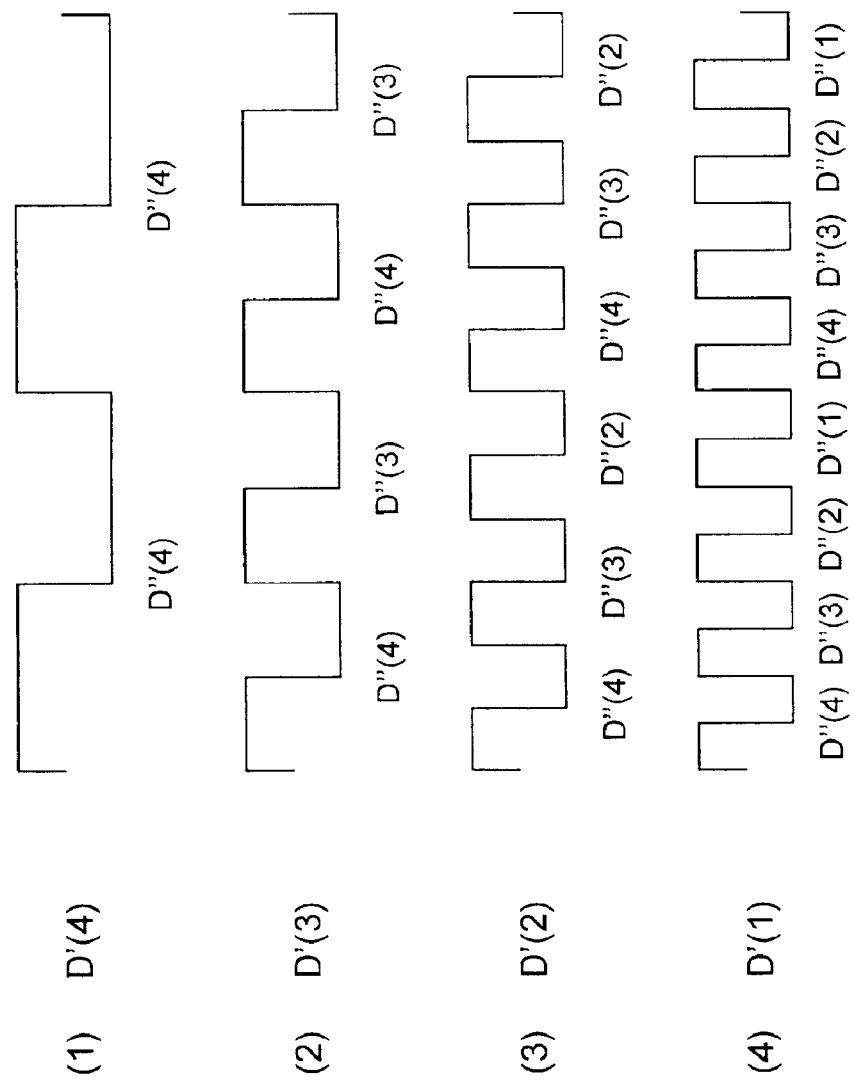
FIG. 4 shows the data traveling through four exemplary RF sub units, in accordance with one embodiment.

Referring to FIG. 4 for an illustration of how data D"(1) to D"(L) is combined into data D'(1) on line 3100(1), in accordance with one embodiment. For illustration purposes, there are four sub units 2200 in a unit 220, i.e., L equals to 4. Further, each stream of data D"(1) to data D"(4) runs at a 10 MHZ frequency. On line 1, sub unit 2200(4) transmits data D"(4) to line 3100(4) as data D'(4) running at 10 MHZ frequency. On line 2, sub unit 2200(3) combines data D"(3) and data D'(4) to form data D'(3) running at 20 MHZ. Data D'(3) includes data D"(3) and D"(4). On line 3, sub unit 2200(2) combines data D"(2) and data D'(3) to form data D'(2) running at 30 MHZ. Data D'(2) includes data D"(2), D"(3), and D"(4). On line 4, sub unit 2200(1) combines data D"(1) and data D'(2) to form data D'(1) running at 40 MHZ. Data D'(1) includes data D"(1), D"(2), D"(3), and D"(4). FIG. 4 shows data D'(3), D'(2), and D'(1) having data D" in the order of D"(4) and D"(3); D"(4), D"(3), and D"(2); and D"(4), D"(3), D"(2), and D"(1), respectively. However, the invention is not limited to a particular order of data D" in each data D'. Any order of data D" in each data D' is within the scope of the invention. For example, data D'(3), D'(2), and D'(1) may include data D" in the reverse order shown in FIG. 4. That is, data D'(3), D'(2), and D'(1) may include data D" in the order of D"(3) and D"(4); D"(2), D"(3), and D"(4), and D"(1), D"(2), D"(3), and D"(4), respectively, etc. In embodiments where the order of data D" in data D'(1) is not predictable, each data D" is earmarked so that baseband chip 210 can identify data D" in data D'(1).

The Data in the Transmitting Mode

Referring to the same FIG. 4 for an illustration of how data is transmitted from baseband chip 210 to each RF sub unit 2200 in a unit 220. On line 4, baseband chip 210 sends data D"(4), D"(3), D"(2), and D"(1) as data D'(1) on line 3100(1) to sub unit 2200(1). Data D'(1) runs at a 40 MHZ frequency. Sub unit 2200(1) keeps data D"(1) for itself, and, as shown on line 3, sends data D"(4), D"(3), and D"(2) as data D'(2) to sub unit 2200(2). Data D'(2) runs at 30 MHZ. Sub unit 2200(2) keeps data D"(2) for itself, and, on line 2, sends data D"(4) and D"(3) as data D'(3) to sub unit 2200(3). Data D'(3) runs at 20 MHZ. Sub unit 2200(3) keeps data D"(3) for itself, and, on line 1, sends data D"(4) as data D'(4) to sub unit 2200(4). Data D'(4) runs at 10 MHZ.

The RF Sub Unit

Figure 5:
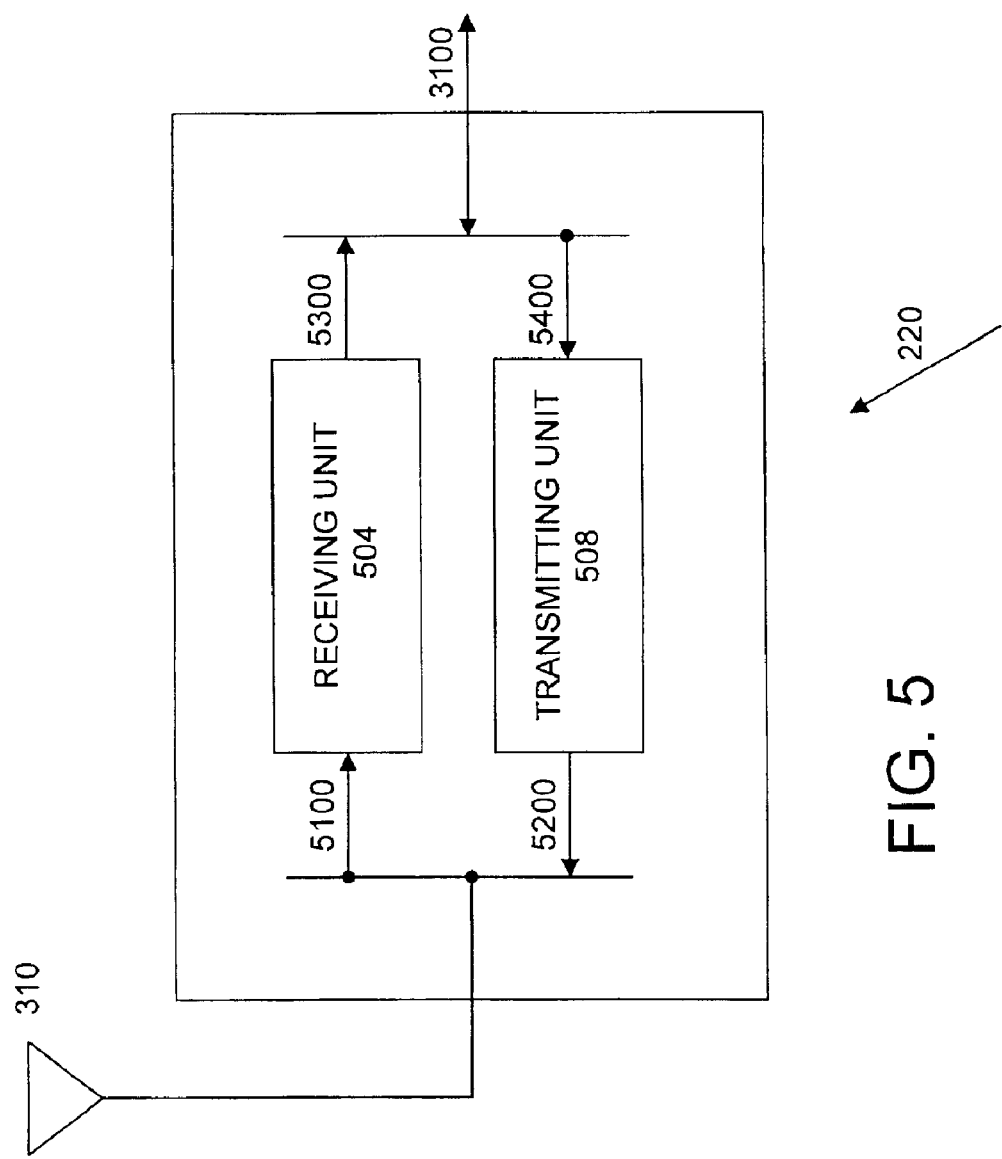
FIG. 5 shows a RF sub unit in accordance with one embodiment.

FIG. 5 shows a RF sub unit 2200 having a receiving unit 504 and a transmitting unit 508, in accordance with one embodiment. Receiving unit 504 receives data from antenna 310 through line 5100, processed the data, and sends the processed data through line 5300 and line 3100 to baseband chip 210. Baseband chip 210 sends the data through line 3100 and line 5400 to transmitting unit 508, which processes the data, and sends the processed data through line 5200 to antenna 310. Depending on applications, lines 5300 and 5400 may be implemented as lines 2400R and 2500T in FIG. 2B, respectively.

The Receiving Unit

Figure 6:
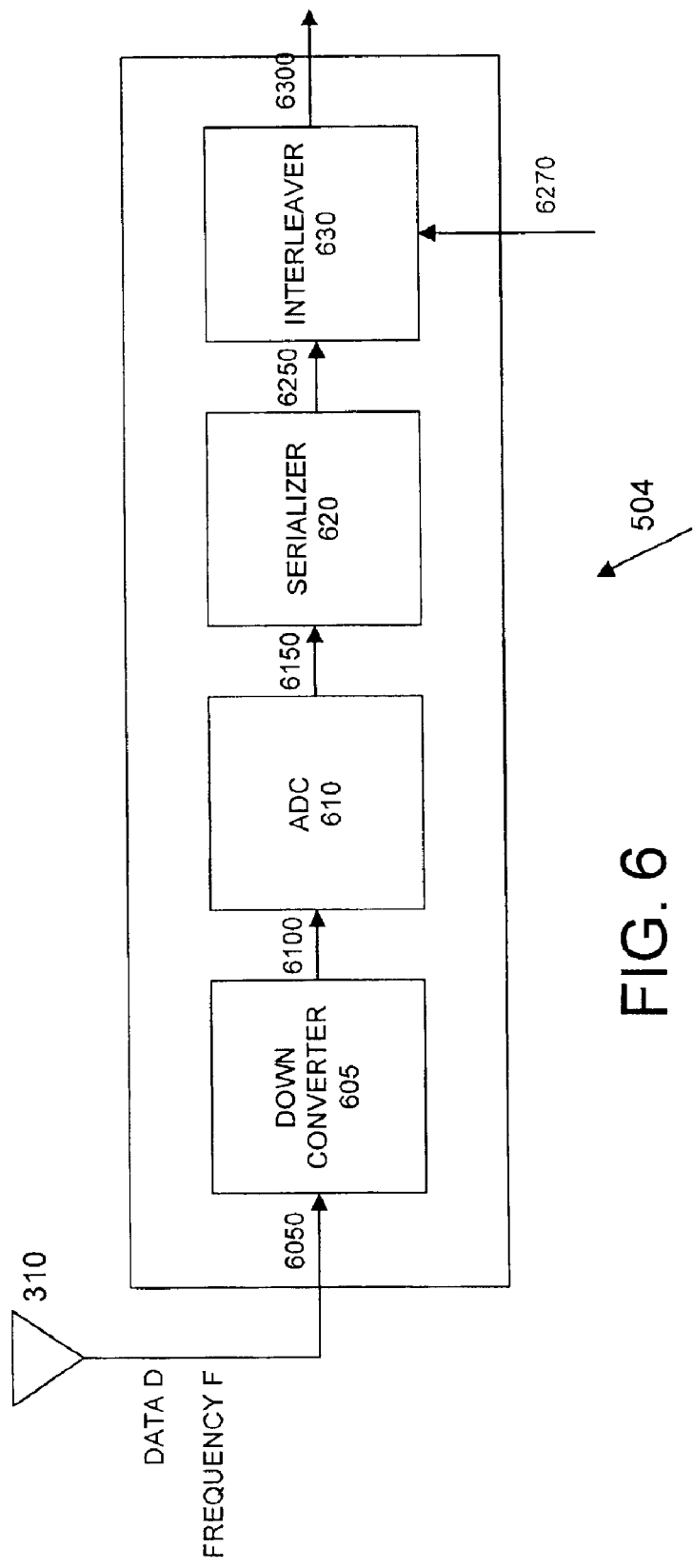
FIG. 6 shows a receiving unit in accordance with one embodiment.

FIG. 6 shows a receiving unit 504 in accordance with one embodiment. Receiving unit 504 includes a down-converter 605, an analog-to-digital converter (ADC) 610, a serializer 620, and an interleaver 630. Down-converter 605 converts the radio frequency of the signals on line 6050 to the intermediate frequency on line 6100. The signal on line 6050 is the data received from antenna 310 and corresponds to data D running at a frequency F in FIG. 3. Line 6050 also corresponds to line 5100 in FIG. 5. ADC 610 converts the data in analog form on line 6100 to digital form on line 6150. Serializer 620 converts the data on line 6150 to the data on line 6250, which, in one embodiment, corresponds to data D" in FIG. 3. Interleaver 630 combines data D" on line 6250 and the data on line 6270 to form the data on line 6300, which corresponds to line 5300 in FIG. 5. If I is an integer, and if receiving unit 604 is in a sub unit 2200(I) in FIG. 3, then line 6300 corresponds to line 3100 (I) while line 6270 corresponds to line 3100 (I+1). For example, if I equals to 1 then line 6300 corresponds to line 3100(1) while line 6270 corresponds to line 3100(2). If I equals to 3 then line 6300 corresponds to line 3100(3) while line 6270 corresponds to line 3100(4), etc. If I equals to L, then line 6300 corresponds to line 3100(L), and there is no line 6270.

The Interleaver

Figure 7A:
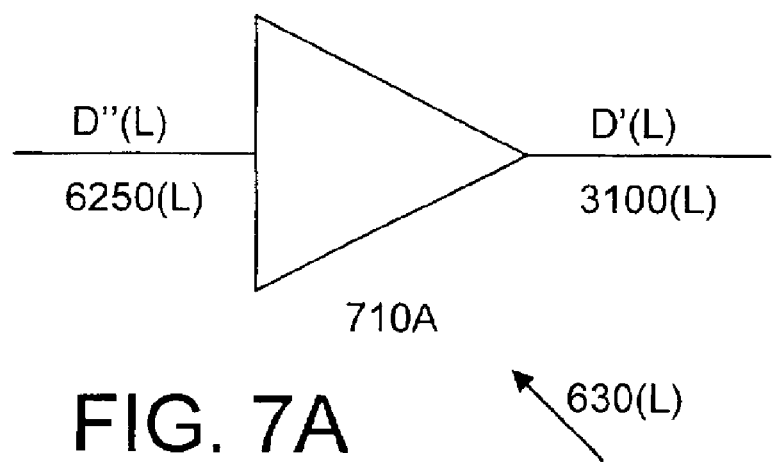
FIG. 7A shows a first type of an interleaver in accordance with one embodiment.
Figure 7B:
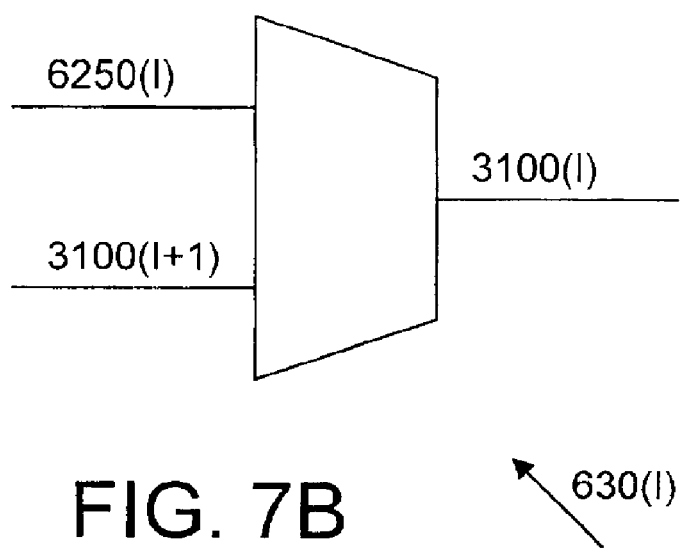
FIG. 7B shows a second type of an interleaver in accordance with one embodiment.

FIGS. 7A and 7B show two different types of interleaver 630, in accordance with one embodiment. In FIG. 7A, interleaver 630(L) corresponds to a RF sub unit 2200(L), which is the last sub unit in a daisy chain. Interleaver 630(L) includes a buffer 710A that passes data D"(L) on line 6250 as data D'(L) on line 3100(L). If L equals to 4, then data D"(4) equals to D'(4) shown on line 1 in FIG. 4.

FIG. 7B shows an interleaver 530(I) corresponding to a RF sub unit 2200(I). Interleaver 530(I) includes a multiplexer (mux) 710B having lines 6250(I) and 3100(I+1) as inputs and line 3100(I) as output. The data on line 6250(I) and on line 3100(I+1) corresponds to data D"(I) running at a 10 MHZ frequency and D'(I+1) running at a frequency of 10 MHZ*(L−I). For each 100 NS period of the output, mux 710B selects the data on line 6250(I) in the first 100 NS/(L−I+1), and selects the data on line 3100(I+1) in the next (L−I) times, each for a period of 100 NS/(L−I+1), resulting in data D'(I) on line 3100(I) running at 100 NS/(L−I+1) periods or a (L−I+1)*10 MHZ frequency.

For example, if L equals to 4, and I equals to 3, then line 6250(I) corresponds to line 6250(3) and line 3100(I+1) equals to line 3100(4). The data on line 6250(3) and on line 3100(4) correspond to data D"(3) and D'(4), which correspond to data D"(4), respectively, each of which runs at a 10 MHZ frequency or a plurality of 100 NS periods. For each 100 NS period of the output, mux 710B selects data D"(3) on line 6250(3) for the first 50 NS, and selects data D'(4) on line 3100(4) for the second 50 NS, resulting in data D'(3) on line 3100(3) running at 50 NS periods or a 20 MHZ frequency. Data D'(3) is shown on line 2 in FIG. 4.

If L equals to 4, and I equals to 2, then line 6250(I) corresponds to line 6250(2) and line 3100(I+1) corresponds to line 3100(3). The data on line 6250(2) and on line 3100(3) correspond to data D"(2) running at a 10 MHZ frequency and data D'(3) running at a 20 MHZ frequency. For each 100 NS period of the output, mux 710B selects data D"(2) on line 6250(2) in the first 33.33 NS, and selects the data on line 3100(3) in the next two 33.33 NS, resulting in data D'(2) on line 3100(2) running at 33.33 NS periods or a 30 MHZ frequency. Data D'(2) is shown on line 3 in FIG. 4.

If L equals to 4, and I equals to 1, then line 6250(I) corresponds to line 6250(1), and line 3100(I+1) corresponds to line 3100(2). The data on line 6250(1) and on line 3100(2) correspond to data D"(1) running at a 10 MHZ frequency and data D'(2) running at a 30 MHZ frequency. Data D'(2) is the combination of data D"(4) and data D"(3). For each 100 NS period of the output, mux 710B selects data D"(1) on line 6250(1) in the first 25 NS, and selects data D'(2) on line 3100(2) in the next three 25 NS, resulting in data D'(1) on line 3100(1) running at 25 NS periods or a 40 MHZ frequency. Data D'(1) is shown on line 4 in FIG. 4.

The Transimitting Unit

Figure 8:
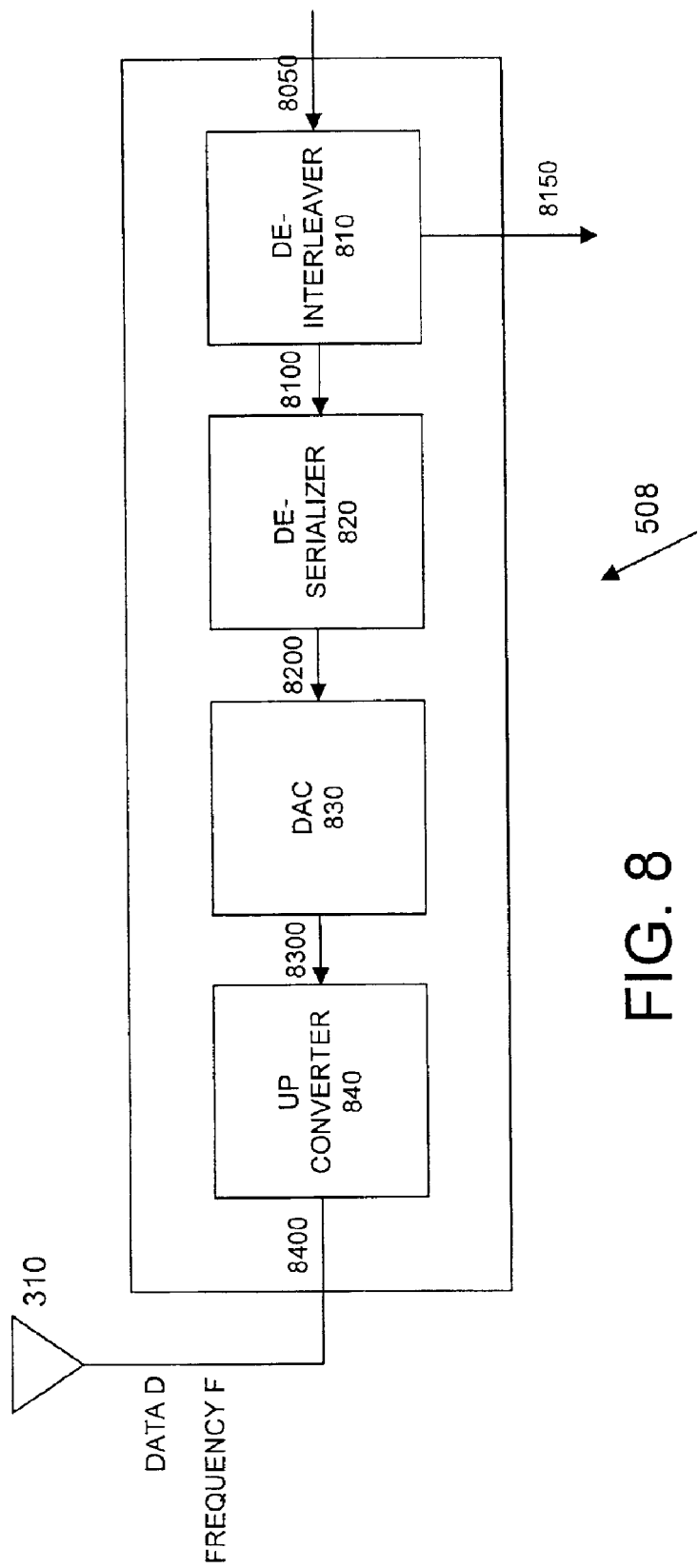
FIG. 8 shows a transmitting unit in accordance with one embodiment.

FIG. 8 shows a transmitting unit 508 of FIG. 5, in accordance with one embodiment. Transmitting unit 508 includes a de-interleaver 810, a de-serializer 820, a digital to analog (DAC) 830, and an up-converter 840.

De-interleaver 810 separates the data on line 8050 into the data on line 8100 and the data on line 8150. Line 8050 corresponds to line 5400 in FIG. 5. If I is an integer, and if receiving unit 508 is in a sub unit 2200(I) in FIG. 3, then line 8050 corresponds to line 3100 (I) while line 8150 corresponds to line 3100 (I+1). For example, if I equals to 1 then line 8050 corresponds to line 3100(1) while line 8150 corresponds to line 3100(2). If I equals to 3 then line 8050 corresponds to line 3100(3) while line 8150 corresponds to line 3100(4), etc. If I equals to L, then line 8050 corresponds to line 3100(L), and there is no line 8150.

De-serializer 820 converts the data on line 8100 to the data on line 8200. The data on line 8100, in one embodiment, corresponds to data D" in FIG. 3. DAC 830 converts the data in digital form on line 8200 to analog form on line 8300. Up-converter 840 converts the intermediate frequency of the data on line 8300 to the radio frequency on line 8400. The data on line 8400 corresponds to data D running at a frequency F in FIG. 3 and is transmitted to antenna 310. Line 8400 also corresponds to line 5200 in FIG. 5

The De-interleaver

Figure 9A:
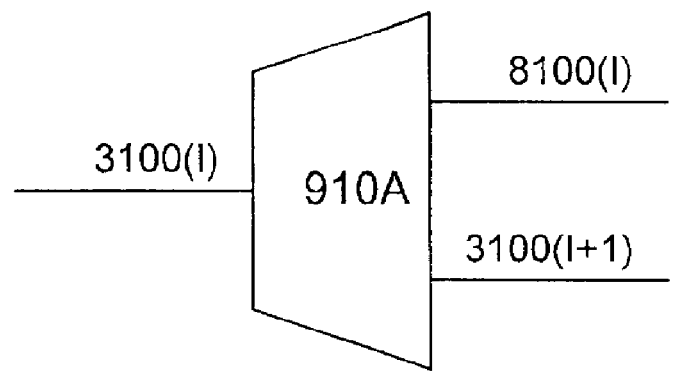
FIG. 9A shows a first type of a de-interleaver in accordance with one embodiment.
Figure 9B:
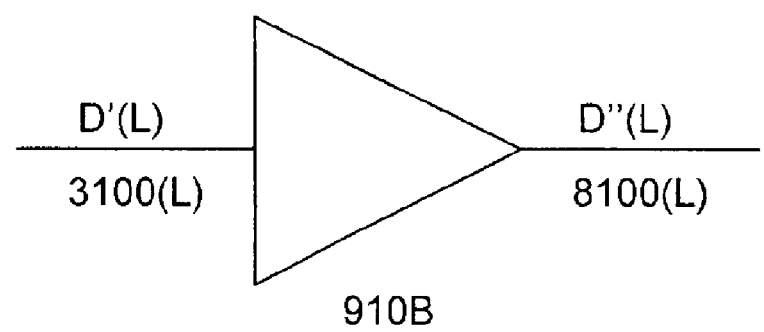
FIG. 9B shows a second type of a de-interleave in accordance with one embodiment.

FIGS. 9A and 9B show two different types of de-interleavers 810, in accordance with one embodiment. FIG. 9A shows a de-interleaver 810(1) corresponding to a RF sub unit 2200(I). De-interleaver 810(I) includes a de-mux 910A having line 3100(I) as input and lines 8100(I) and 3100(I+1) as outputs. The data on line 3100(I) runs at a (L−I+1)* 10 MHZ frequency and includes the data D"(I) to data D"(L). For each 100 NS of data D'(I), de-mux 910A assigns the first 100 NS/(L−I+1) to line 8100(1) running at 10 MHZ and the next (L−I) times of 100 NS/(L−I+1) to line 3100(I+1) running at (L−I)*10 MHZ. The data on line 8100(I) corresponds to data D"(I) while the data on line 3100(I+1) corresponds to data D'(I+1).

If L equals to 4, and I equals to 1, then line 3100(I) corresponds to line 3100(1), line 8100(I) corresponds to line 8100(1), and line 3100(I+1) corresponds to line 3100(2). The data on line 3100(1) corresponds to data D'(1) and runs at a 40 MHZ frequency or 25 NS periods. Data D'(1) includes the data D"(1), data D"(2), data D"(3), and data D"(4). For each 100 NS of data D'(1), de-mux 910A assigns the first 25 NS to line 8100(1) running at 10 MHZ and the next three 25 NS to line 3100(2) running at 30 MHZ. The data on line 8100(1) corresponds to data D"(1) while the data on line 3100(2) corresponds to data D'(2). Data D'(1) is shown on line 4 and data D'(2) is shown on line 3 in FIG. 4.

If L equals to 4, and I equals to 2, then line 3100(I) corresponds to line 3100(2), line 8100(I) corresponds to line 8100(2), and line 3100(I+1) corresponds to line 3100(3). The data on line 3100(2) corresponds to data D'(2) and runs at a 30 MHZ frequency or 33.33 NS periods. Data D'(2) includes data D"(2), data D"(3), and data D"(4). For each 100 NS of data D'(2), de-mux 910A assigns the first 33.33 NS to line 8100(2) running at 10 MHZ and the next two 33.33 NS to line 3100(3) running at 20 MHZ. The data on line 8100(2) corresponds to data D"(2) while the data on line 3100(3) corresponds to data D'(3). Data D'(2) is shown on line 3 and data D'(3) is shown on line 2 in FIG. 4.

If L equals to 4, and I equals to 3, then line 3100(I) corresponds to line 3100(3), line 8100(I) corresponds to line 8100(3), and line 3100(I+1) corresponds to line 3100(4). The data on line 3100(3) corresponds to data D'(3) and runs at a 20 MHZ frequency or 50 NS periods. Data D'(3) includes data D"(3) and data D"(4). For each 100 NS of data D'(3), de-mux 910A assigns the first 50 NS to line 8100(3) running at 10 MHZ and the next 50 NS to line 3100(4) running at 10 MHZ. The data on line 8100(3) corresponds to data D"(3) while the data on line 3100(4) corresponds to data D'(4), which corresponds to data D"(4). Data D'(3) is shown on line 2 and data D'(4) is shown on line 1 in FIG. 4.

In FIG. 9B, de-interleaver 810(L) corresponds to a RF sub unit 2200(L), which is the last sub unit in a daisy chain. De-interleaver 810(L) includes a buffer 910B that passes data D'(L) on line 3100(L) as data D"(L) on line 8100(L). If L equals to 4, then data D"(4) equals to data D'(4) shown on line 1 in FIG. 4.

The Baseband Chip

Figure 10:
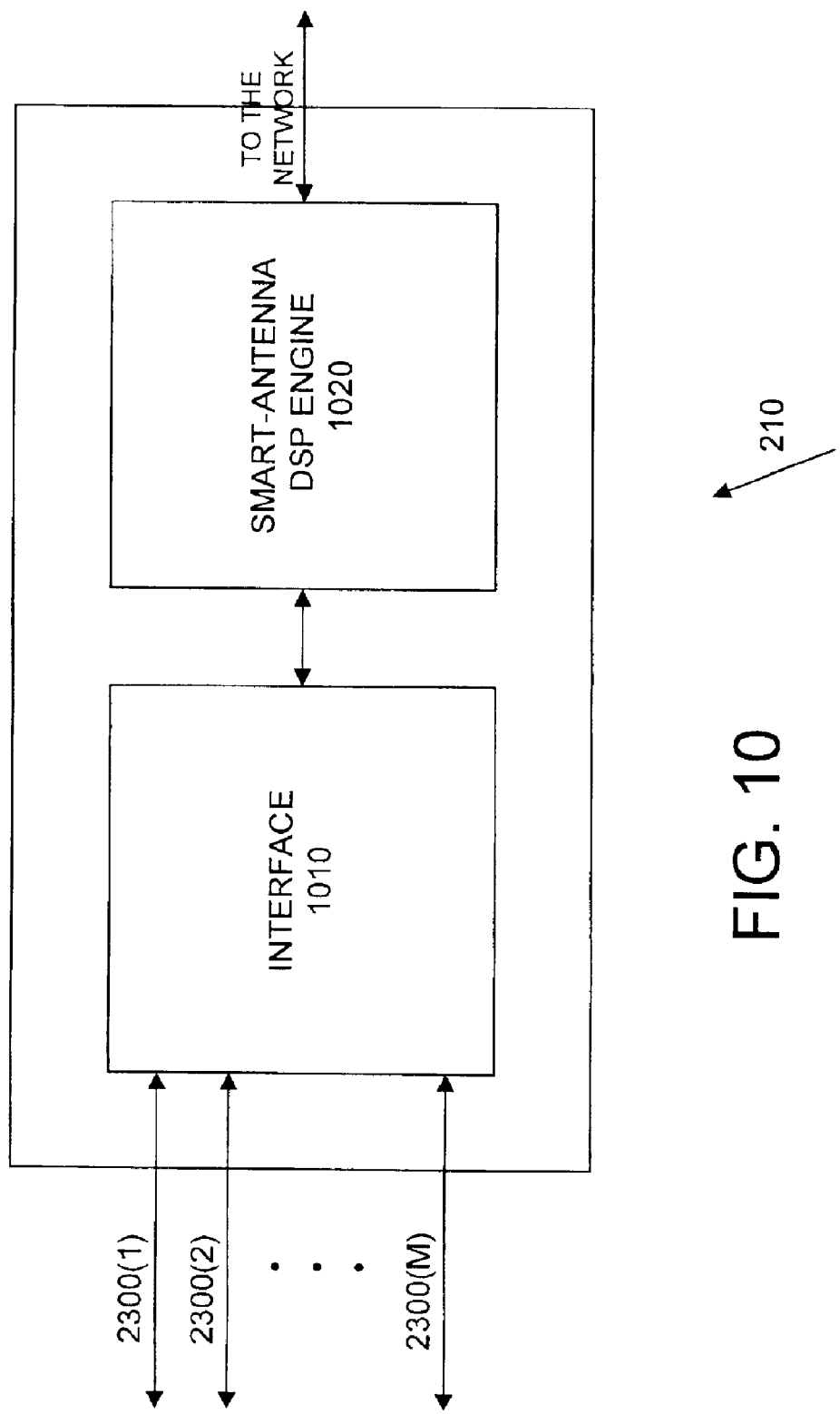
FIG. 10 shows a baseband unit in accordance with one embodiment.

FIG. 10 shows a baseband chip 210 in accordance with one embodiment. Chip 210 includes an interface 1010 and a smart-antenna DSP engine 1020.

Interface 1010 receives data D"(1) to data D"(L) in the combined form for each line 2300(1) to 2300(M) in FIG. 2A. The data on line 2300 for each RF unit 220 corresponds to data D'(1) on line 3100(1) in FIG. 3. In the receiving mode, for each RF unit 220, interface 1010 separates the combined data D'(1) to each data D" corresponding to each RF sub unit 2200 and its associated antenna 310. In one embodiment, interface 1010 recognizes data D" of each RF sub unit based on the order the data D" is sent to interface 1010. For example, in the example of FIG. 4, for each RF unit 220, interface 1010 receives data D'(1) in the order of sub unit 2200(1) to sub unit 2200(L), e.g., in the order of data D"(1) to data D"(L). Recognizing the frequency and the order of data D" in data D'(1), interface 1010 can identify D" for each sub unit 2200. In the above example that L equals to 4, data D'(1) received at interface 1010 runs at a 40 MHZ frequency or a plurality of 25 NS periods. In the same example, for each 100 NS data D'(1) includes the data in the order of data D"(1), data D"(2), data D"(3), and data D"(4) for the first, the second, the third, and the fourth 25 NS, respectively. Consequently, interface 1010 can accordingly identify each data D". Alternatively, interface 1010 can use a signal earmarked in data D" and thus data D'(1) to identify data D". Data D" is earmarked when it is sent through its corresponding RF sub units 2200. The invention is not limited to a method for interface 1010 to recognize the data and its associated antenna.

Conversely, in the transmitting mode, when interface 1010 sends data to a RF unit 220, interface 1010 combines the data corresponding to each RF sub units 2200 into data D'(1) which runs at a frequency being the sum of the frequency of the data D" for each sub unit 2200. Each sub unit 2200, via its de-interleaver, keeps the data for itself, and sends the rest of the data to the next sub unit 2200 as explained above.

Smart antenna DSP engine 1020 uses the adaptive array techniques to process the data accordingly. For example, in the receiving mode, engine 1020 processes the data received from each antenna 310, e.g., data D"(1) to data D"(L), then sends the processed data to be further processed by the network layers such as the physical layer (PHY) and the media access control (MAC) layer. The data is eventually sent to the network, which in one embodiment is the LAN. Similarly, in the transmitting mode, engine 1020 receives the data from the LAN via the network layers, processes the data, then sends the data to interface 1010, etc.

In the foregoing, the invention has been described with reference to various embodiments. However, those skilled in the art will recognize that the invention is not limited to those embodiments; variations and modifications may be made without departing from the scope of the invention; and the specification including the drawings is to be regarded as illustrative rather than as restrictive.

What is claimed is:

1. A method for transferring data in a wireless communication system, comprising the steps of:

allowing a first component to carry a first data stream running at a first frequency;

allowing a second component to carry a second data stream running at a second frequency;

transferring the second data stream from the second component through the first component, which combines the first data stream and the second data stream to form a third data stream running at a third frequency, which is the sum of the first frequency and the second frequency; and sending the third data stream to a third component;

wherein each of the first component and the second component is a radio-frequency sub unit, and the third component is a baseband unit; the first component, the second component, and the third component are for use in an access point of the wireless communication system.

2. The method of claim 1 wherein the wireless communication system uses the technology selected from a group consisting of the code-division multiple access, the time-division multiple access, and the global system for mobile communications.

3. The method of claim 1 wherein the wireless communication system is connected to an electronic network.

4. The method of claim 1 wherein the first and the second data stream are transformed from a fourth and a fifth data stream received from a first antenna and a second antenna, respectively.

5. The method of claim 1 wherein the second component is removably connected to the first component.

6. The method of claim 1 wherein the first component is removably connected to the third component.

7. The method of claim 1 wherein each of the first component and the second component is a radio-frequency sub unit being part of a radio-frequency unit, and the third component is adaptable to a plurality of the radio-frequency units.

8. The method of claim 1 wherein
each of the first component and the second component is a radio-frequency sub unit of a radio-frequency unit, and
the maximum frequency allowable at a line connecting the radio frequency unit to the third component determines the maximum number of the radio-frequency sub units connected as a daisy chain in the radio-frequency unit.

9. The method of claim 1 wherein sending the third data stream to the third component is via a connecting point between the first component and the third component; the connecting point is also for use in sending data from the third component to the first component.

10. The method of claim 1 further comprising the step of the third component separating the third data stream into the first data stream and the second data stream.

11. A method for transferring data in a wireless communication system, comprising the steps of:
providing a first data stream running at a first frequency to be carried by a first component;
providing a second data stream running at a second frequency to be carried by a second component;
a third component combining the first data stream and the second data stream to form a third data stream running at a third frequency being the sum of the first frequency and the second frequency; and
transferring the third data stream from the third component through the first component, which separates the third data stream into the first data stream and the second data stream, then sends the second data stream to the second component.

12. The method of claim 11 wherein the wireless communication system uses the technology selected from a group consisting of the code-division multiple access, the time-division multiple access, and the global system for mobile communications.

13. The method of claim 11 wherein each of the first component and the second component is a radio-frequency sub unit, and the third component is a baseband unit; the first component, the second component, and the third component are for use in an access point of the wireless communication system.

14. The method of claim 11 wherein the wireless communication system is connected to an electronic network.

15. The method of claim 11 wherein the first and the second data stream are transformed into a fourth and a fifth data stream to be sent through a first antenna and a second antenna, respectively.

16. The method of claim 11 wherein the second component is removably connected to the first component.

17. The method of claim 11 wherein the first component is removably connected to the third component.

18. The method of claim 11 wherein each of the first component and the second component is a radio-frequency sub unit being part of a radio-frequency unit, and the third component is adaptable to a plurality of the radio-frequency units.

19. The method of claim 11 wherein the first frequency and the second frequency are substantially the same.

20. The method of claim 11 wherein
each of the first component and the second component is a radio-frequency sub unit of a radio-frequency unit, and
the maximum frequency allowable at a line connecting the radio-frequency unit to the third component determines the maximum number of the radio-frequency sub units connected as a daisy chain in the radio-frequency unit.

21. The method of claim 11 wherein transferring the third data stream from third component is via a connecting point between the first component and the third component; the connecting point is also for use in receiving data from the first component to the third component.

22. An access point for use in a wireless communication system, comprising:
at least one radio-frequency unit connected via a connecting point to a baseband unit; wherein
the radio-frequency unit having a plurality of sub units connected as a daisy chain, including a first sub unit and a second sub unit;
the first sub unit carries a first data stream running at a first frequency;
the second sub unit carries a second data stream running at a second frequency; and
in a receiving mode, the first sub unit combines the first data stream and the second data stream received from the second unit to form a third data stream running at a third frequency, which is the sum of the first frequency and the second frequency.

23. The access point of claim 22 wherein a sub unit of the at least one radio-frequency unit is connected to at least one antenna through which a stream of data is received.

24. The access point of claim 22 wherein a radio-frequency unit of the least one radio-frequency unit is removably connected to the baseband unit.

25. The access point of claim 22 wherein the connecting point is for use in both the receiving mode and a transmitting mode of the access point.

26. The access point of claim 22 wherein the baseband unit separates the third data stream into the first data stream and the second data stream.

27. An access point for use in a wireless communication system, comprising:
at least one radio-frequency unit connected via a connecting point to a baseband unit; wherein
a radio-frequency unit having a plurality of sub units connected as a daisy chain, including a first sub unit to carry a first data stream running at a first frequency and a second sub unit to carry a second data stream running at a second frequency; and
in a transmitting mode, the baseband unit combines the first data stream and the second data stream to form a third data stream running at a third frequency being the sum of the first frequency and the second frequency; the baseband unit transfers the third data stream to the first sub unit, which separates the third data stream into the first and the second data stream, then sends the second data stream to the second component.

28. The access point of claim 27 wherein a sub unit of the at least one radio-frequency unit is connected to at least one antenna through which a stream of data is received.

29. The access point of claim 27 wherein a radio-frequency unit of the least one radio-frequency unit is removably connected to the baseband unit.

30. The access point of claim 27 wherein the connecting point is for use in both the transmitting mode and a receiving mode of the access point.

31. A unit for use in a wireless communication system, comprising:
L number of sub units connected as a daisy chain;
wherein L is an integer number, each sub unit carries a data stream D" running at a frequency F", and if an integer I does not equal to L, then, in a receiving mode,
the Ith sub unit of the daisy chain carries a data stream D"(I) running at a F"(I) frequency;
the Ith sub unit receives a data stream D'(I+1) running at a frequency F'(I+1), from the (I+1)th sub unit; and
the Ith sub unit combines the data stream D"(I) and the data stream D'(I+1) to form the data stream D'(I) running at a frequency F'(I), which is the sum of the frequency F"(I) and the frequency F'(I+1).

32. The unit of claim 31 wherein a baseband unit receives a data stream D'(1) of the first sub unit in the daisy chain; the data stream D'(1) includes the data D" of all the sub units in the daisy chain; the data stream D'(1) runs at a frequency F'(1), which is the sum of all frequency F" of all of the data D".

33. The unit of claim 31 being connected to a baseband chip via a connecting point, which is for use in both the receiving mode and a transmitting mode of the unit.

34. A unit for use in a wireless communication system, comprising:
L number of sub units connected as a daisy chain;
wherein L is an integer number, each sub unit carries a data stream D" running at a frequency F", and if an integer I does not equal to L, then, in a transmitting mode,
the Ith sub unit of the daisy chain carries a data stream D"(I) running at a F"(T) frequency;
the Ith sub unit receives a data stream D'(I) running at a frequency F'(I);
the Ith sub unit separates the data stream D'(I) into the data stream D"(I) and a data stream D'(I+1) running at a frequency F'(I+1); and
the Ith sub unit sends the data stream D'(I+1) to the (I+1)th sub unit;
wherein the frequency F'(I) is the sum of the frequency P"(I) and the frequency F'(I+1).

35. The unit of claim 34 wherein a baseband unit sends a data stream D'(1) of the first sub unit in the daisy chain; the data stream D'(1) includes the data D" of all the sub units in the daisy chain; the data stream D'(1) runs at a frequency F'(1), which is the sum of all frequency F" of all the data D".

36. The unit of claim 34 being connected to a baseband chip via a connecting point, which is for use in both the transmitting mode and a receiving mode of the unit.

37. A method for transferring data in a wireless communication system, comprising the steps of:
allowing a first component to carry a first data stream running at a first frequency;
allowing a second component to carry a second data stream running at a second frequency;
transferring the second data stream from the second component through the first component, which combines the first data stream and the second data stream to form a third data stream running at a third frequency, which is the sum of the first frequency and the second frequency; and sending the third data stream to a third component;
wherein the first and the second data stream are transformed from a fourth and a fifth data stream received from a first antenna and a second antenna, respectively.

38. A method for transferring data in a wireless communication system, comprising the steps of:
allowing a first component to carry a first data stream running at a first frequency;
allowing a second component to carry a second data stream running at a second frequency;
transferring the second data stream from the second component through the first component, which combines the first data stream and the second data stream to form a third data stream running at a third frequency, which is the sum of the first frequency and the second frequency; and sending the third data stream to a third component;
wherein each of the first component and the second component is a radio-frequency sub unit being part of a radio-frequency unit, and the third component is adaptable to a plurality of the radio-frequency units.

39. A method for transferring data in a wireless communication system, comprising the steps of:
allowing a first component to carry a first data stream running at a first frequency;
allowing a second component to carry a second data stream running at a second frequency;
transferring the second data stream from the second component through the first component, which combines the first data stream and the second data stream to form a third data stream running at a third frequency, which is the sum of the first frequency and the second frequency; and sending the third data stream to a third component;
wherein each of the first component and the second component is a radio-frequency sub unit of a radio-frequency unit, and the maximum frequency allowable at a line connecting the radio frequency unit to the third component determines the maximum number of the radio-frequency sub units connected as a daisy chain in the radio-frequency unit.

40. A method for transferring data in a wireless communication system, comprising the steps of:
allowing a first component to carry a first data stream running at a first frequency;
allowing a second component to carry a second data stream running at a second frequency;
transferring the second data stream from the second component through the first component, which combines the first data stream and the second data stream to form a third data stream running at a third frequency, which is the sum of the first frequency and the second frequency; and
sending the third data stream to a third component; wherein sending the third data stream to the third component is via a connecting point between the first component and the third component; the connecting point is also for use in sending data from the third component to the first component.

41. A method for transferring data in a wireless communication system, comprising the steps of:
allowing a first component to carry a first data stream running at a first frequency;
allowing a second component to carry a second data stream running at a second frequency;
transferring the second data stream from the second component through the first component, which combines the first data stream and the second data stream to form a third data stream running at a third frequency, which is the sum of the first frequency and the second frequency; and sending the third data stream to a third component;

the third component separating the third data stream into the first data stream and the second data stream.

* * * * *